United States Patent
Kang

(10) Patent No.: US 10,316,907 B2
(45) Date of Patent: Jun. 11, 2019

(54) BRAKE APPARATUS OF EXTERNAL-ROTOR MOTOR

(71) Applicant: NEDEC Co., Ltd., Suwon-si (KR)

(72) Inventor: Sang Sun Kang, Suwon-si (KR)

(73) Assignee: NEDEC Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/825,226

(22) Filed: Nov. 29, 2017

(65) Prior Publication Data
US 2018/0149215 A1 May 31, 2018

(30) Foreign Application Priority Data
Nov. 30, 2016 (KR) .................. 10-2016-0161864

(51) Int. Cl.
| B66D 5/08 | (2006.01) |
| F16D 49/00 | (2006.01) |
| F16D 65/06 | (2006.01) |
| F16D 65/28 | (2006.01) |
| F16D 125/64 | (2012.01) |
| F16D 125/40 | (2012.01) |
| F16D 125/58 | (2012.01) |
| F16D 121/26 | (2012.01) |

(52) U.S. Cl.
CPC .............. *F16D 49/00* (2013.01); *F16D 65/06* (2013.01); *F16D 65/28* (2013.01); *F16D 2121/26* (2013.01); *F16D 2125/40* (2013.01); *F16D 2125/585* (2013.01); *F16D 2125/64* (2013.01)

(58) Field of Classification Search
CPC .......... F16D 49/00; F16D 65/06; F16D 65/28; B66D 5/00; B66D 5/08

USPC .............. 188/74, 78, 170, 171, 17, 26, 71.5
See application file for complete search history.

(56) References Cited

U.S. PATENT DOCUMENTS

| 1,368,336 A * | 2/1921 | Gysel ...................... F16D 49/16 188/171 |
| 1,660,620 A * | 2/1928 | Lautrup ................... B66D 5/00 188/171 |
| 4,306,637 A * | 12/1981 | Keiser ...................... B66D 5/08 188/170 |
| 5,244,060 A * | 9/1993 | Tanaka ...................... B66B 1/32 187/261 |
| 5,337,878 A * | 8/1994 | Mehlert ................... B66D 5/08 188/171 |

(Continued)

FOREIGN PATENT DOCUMENTS

| JP | 2003-106348 A | 4/2003 |
| KR | 10-2013-0090434 A | 8/2013 |

*Primary Examiner* — Christopher P Schwartz
(74) *Attorney, Agent, or Firm* — Revolution IP, PLLC

(57) ABSTRACT

A brake apparatus stops a rotor of an external-rotor motor that drives the head or a joint of a home robot. Frictional torque is generated when a friction pad presses a rotor surface even when a power source is switched off. A posture of a moving part, such as the head, of the robot is not abruptly disturbed even though the power source is switched off. Since a light external force is applied to the moving part of the robot in the off state of the power source, a motion in a direction desired by the user takes places without being stiff. The motion of the head of the robot stops when the external force is removed. An intention of the user who touches the robot may be satisfied even when the power source of the robot is switched off.

10 Claims, 8 Drawing Sheets

(56) References Cited

U.S. PATENT DOCUMENTS 6,095,289 A * 8/2000 Ray .................. B66B 5/18
                                              188/1.11 E
2008/0308360 A1* 12/2008 Weinberger .......... B66D 5/08
                                              187/288

* cited by examiner (a)

(b)

(a)

(b)

(a)   (b)

(c)

BRAKE APPARATUS OF EXTERNAL-ROTOR MOTOR

BACKGROUND OF THE INVENTION

1. Field of the Invention

The present invention relates to a brake apparatus of an external-rotor motor, and more particularly, to a brake apparatus of an external-rotor motor that stops a rotor of the external-rotor motor with a frictional torque that is generated when a friction pad of a brake presses a rotor surface even when a power source is switched off.

2. Description of the Related Art

Due to the advent of electric vehicles, brake systems mounted on the electric vehicles also have been actively developed. In the case of the electric vehicles, a brake system has to be operated so that the vehicle cannot be moved when a power source is switched off, and an electronic brake system that shows a very strong restriction force such that the vehicle may firmly maintains a stop state is required in consideration of the weight and safety of the vehicle.

However, the electronic brake system is not used only for a large-scale apparatus such as an electric vehicle. For example, an era for small-sized robots, so called, home robots, which are used for various purposes, such as a toy, has come, and the brake apparatus may be used for such a home robot.

FIG. 1 is a view illustrating an embodiment of such a home robot 50.

In FIG. 1, the head 51 or a joint of the home robot 50 may face the front side or may move at various angles in a state in which a power source of an external-rotor motor that is used for a driving source that drives the head or a joint of the robot directly or indirectly (when a gear or another mechanism is connected between a protruding shaft of the external-rotor motor and the head or the joint of the robot) is switched on. In the case in which the power source is switched off, the head 51 is weakly rotated to face the lower side or be deflected, or the head 51 may move here and there as the home robot 50 is made to move.

It is excessively complex and cost-consuming to use a brake apparatus used for an electric vehicle to prevent this, and the head 51 will not move at all during an operation of the brake so that the home robot cannot move even if a person makes a light touch.

SUMMARY OF THE INVENTION

It is an object of the present invention to provide an inexpensive electro-mechanical brake system, and moreover, it is an object of the present invention to provide an electro-mechanical brake system, when the user applies a mild external force to the moving part of the robot even in the power off state, the robot is not stiff but moves in a direction according to the user's intention. Further, and when the external force is stopped, the brake device is also stopped while maintaining the posture of the moment.

In accordance with an aspect of the present invention, there is provided a brake apparatus of an external-rotor motor, including a frame configured to transmit a braking force to a rotor surface of the external-rotor motor, a pivot shaft functioning as a motion axis of the frame while supporting the frame at a specific location on the frame, a friction pad coupled to one end of the frame and contacting the rotor surface of the external-rotor motor as the frame moves, a spring configured to apply a pushing force to a spring contact portion at the other end of the frame, an electrical driving device, a lead screw coupled to the electrical driving device and rotated according to driving of the electrical driving device, and a slider engaged with the lead screw, translated on the lead screw as the lead screw rotates according to the driving of the electrical driving device, and configured to apply a force that is resistant to a pushing force of the spring to the spring contact part of the frame.

When a power source is switched off, the lead screw may be rotated such that the slider is moved in a direction that becomes far away from the electrical driving device, and the frame is moved by a force of the spring, by which the spring contact part is pushed, such that the friction pad at one end thereof contacts the rotor surface of the external-rotor motor, and when a power source is switched on, the lead screw may be rotated such that the slider is moved in a direction that becomes closer to the electrical driving device, and the frame is moved by a force, with which the spring contact part is pushed by the slider, such that the friction pad at one end thereof is separated from the rotor surface of the external-rotor motor.

When the power source is switched off, a final location of the slider may become a limit point, by which movement of the spring contact part due to the pushing force of the spring is limited.

In accordance with another aspect of the present invention, there is provided a brake apparatus of an external-rotor motor, including a frame configured to transmit a braking force to a rotor surface of the external-rotor motor, a pivot shaft functioning as a motion axis of the frame while supporting the frame at a specific location on the frame, a friction pad coupled to one end of the frame and contacting the rotor surface of the external-rotor motor as the frame moves, a spring configured to apply a pushing force to a spring contact part at an opposite end of the frame, an electrical driving device, a lead screw coupled to the electrical driving device and rotated according to driving of the electrical driving device, a slider engaged with the lead screw and translated on the lead screw as the lead screw rotates according to driving of the electrical driving device, a rail shaft disposed beside the lead screw in parallel to the lead screw, and a slider (hereinafter, a 'second slider') located on the rail shaft and translated as the slider on the lead screw is translated.

when a power source is switched off, the lead screw may be rotated such that the slider is moved in a direction that becomes far away from the electrical driving device, and the frame is moved by a force of the spring, by which the spring contact part is pushed, such that the friction pad at one end thereof contacts the rotor surface of the external-rotor motor, and when a power source is switched on, the lead screw may be rotated such that the slider is moved in a direction that becomes closer to the electrical driving device, and the frame is moved by a force, with which the spring contact part is pushed by the second slider translated together with the slider, such that the friction pad at one end thereof is separated from the rotor surface of the external-rotor motor.

The brake apparatus may further include a slider sensor located below the second slider and configured to detect movement of the second slider to recognize a location of the second slider.

A vertical bar may be attached to the second slider, and the slider sensor may detect movement of the bar to recognize the location of the second slider.

The brake apparatus may further include a torsion spring functioning to press the slider on the lead screw to the lead screw such that the slider on the lead screw is stably engaged with thread of the lead screw while being moved The brake apparatus may further include a flexible PCB functioning to deliver a control signal between the brake apparatus of the external-rotor motor and a control device configured to control the brake apparatus of the external-rotor motor.

The present invention provides an inexpensive electro-mechanical brake system, and even when the power of an external motor for driving a head or a joint of a home robot or the like is turned off, the posture of a moving part such as a head of the robot suddenly becomes disturbed and when the user applies a slight external force to the moving part of the robot even in the power off state, the robot does not stiff and shows the movement in the direction corresponding to the user's intention. In addition, when the external force is stopped, there is provided an emotional braking device capable of satisfying the intention of the user who touches the robot even when the power of the robot is turned off.

BRIEF DESCRIPTION OF THE DRAWINGS

Hereinafter, exemplary embodiments of the present invention for achieving the effects will be described in detail with reference to the accompanying drawings.

DETAILED DESCRIPTION OF THE INVENTION

Figure 1:
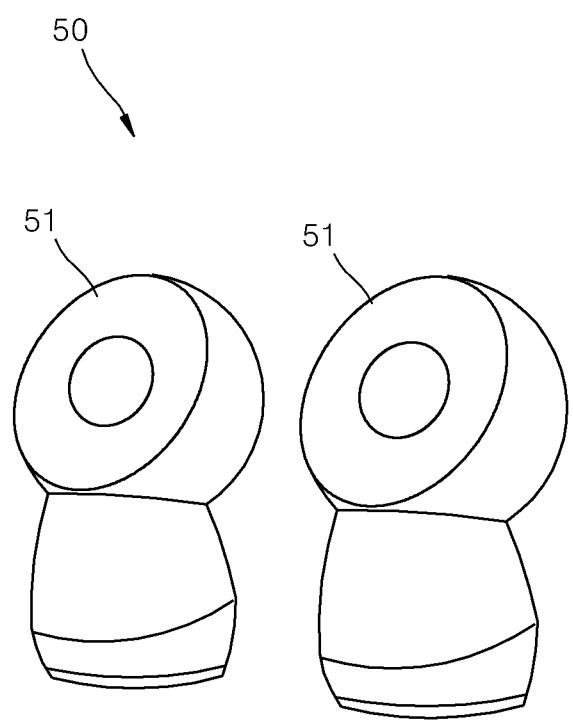
FIG. 1 is a view illustrating an embodiment of a home robot used at home.

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

Figure 2:
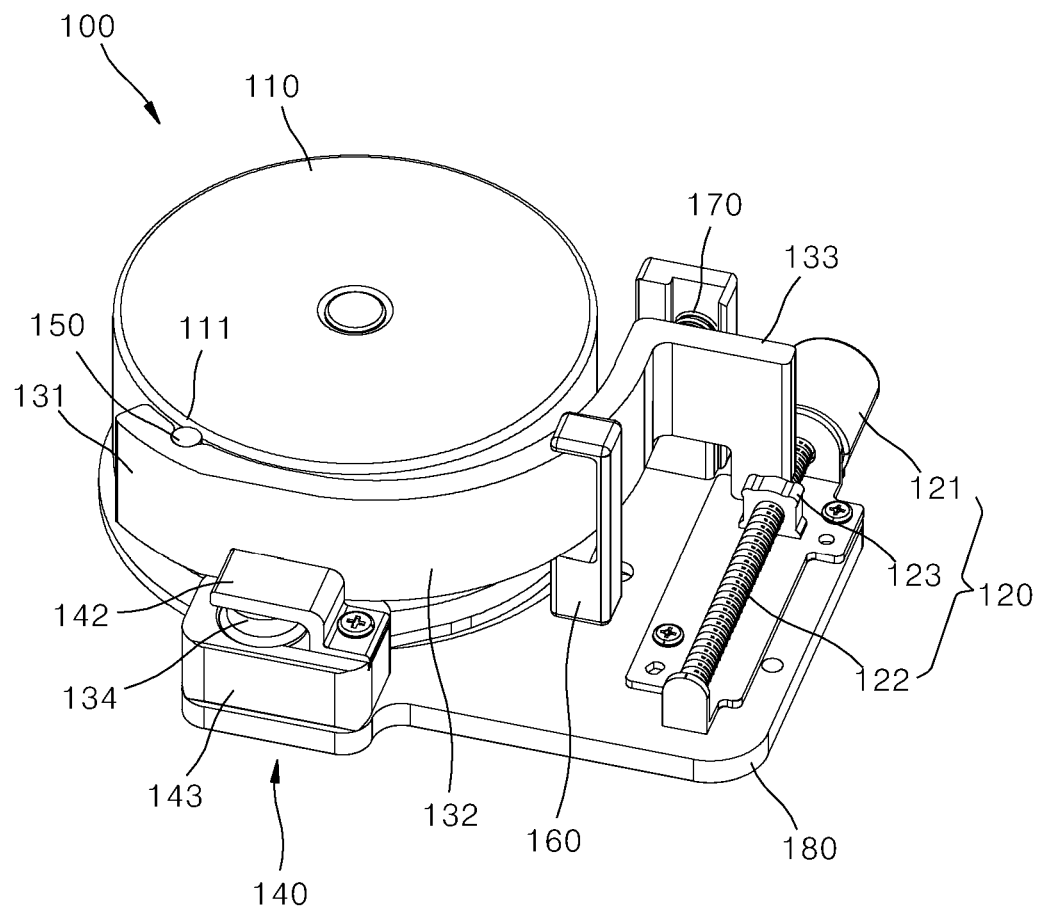
FIG. 2 is a perspective view obtained by obliquely looking down a brake apparatus of an external-rotor motor according to a first embodiment of the present invention.
Figure 3:
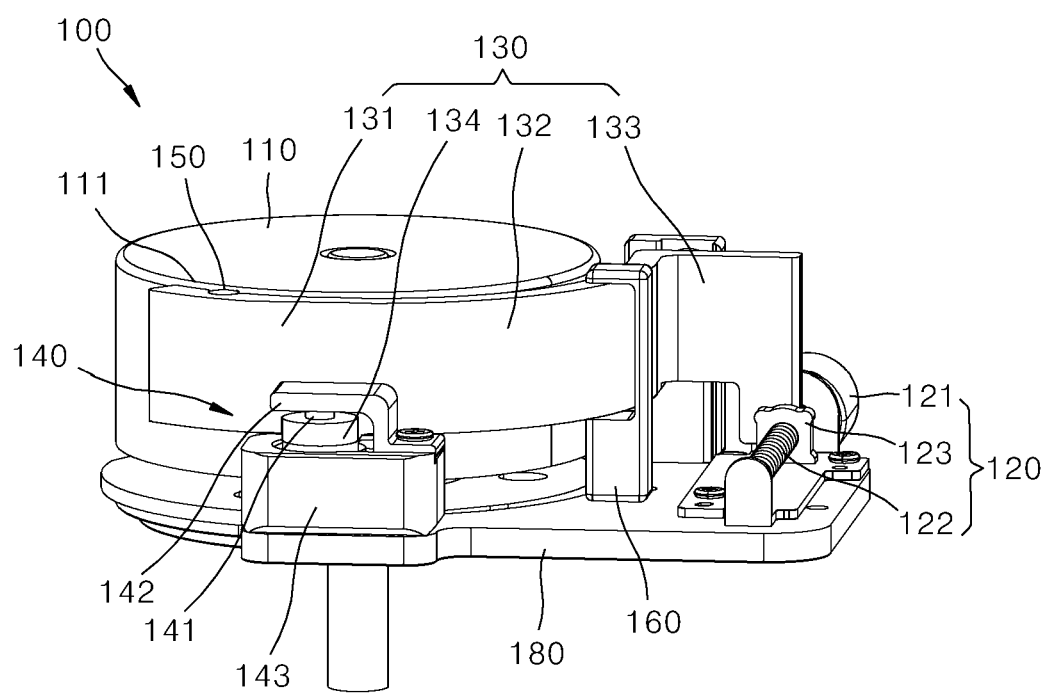
FIG. 3 is a side view of the brake apparatus of an external-rotor motor according to the first embodiment of the present invention, when viewed from a lateral side.
Figure 4:
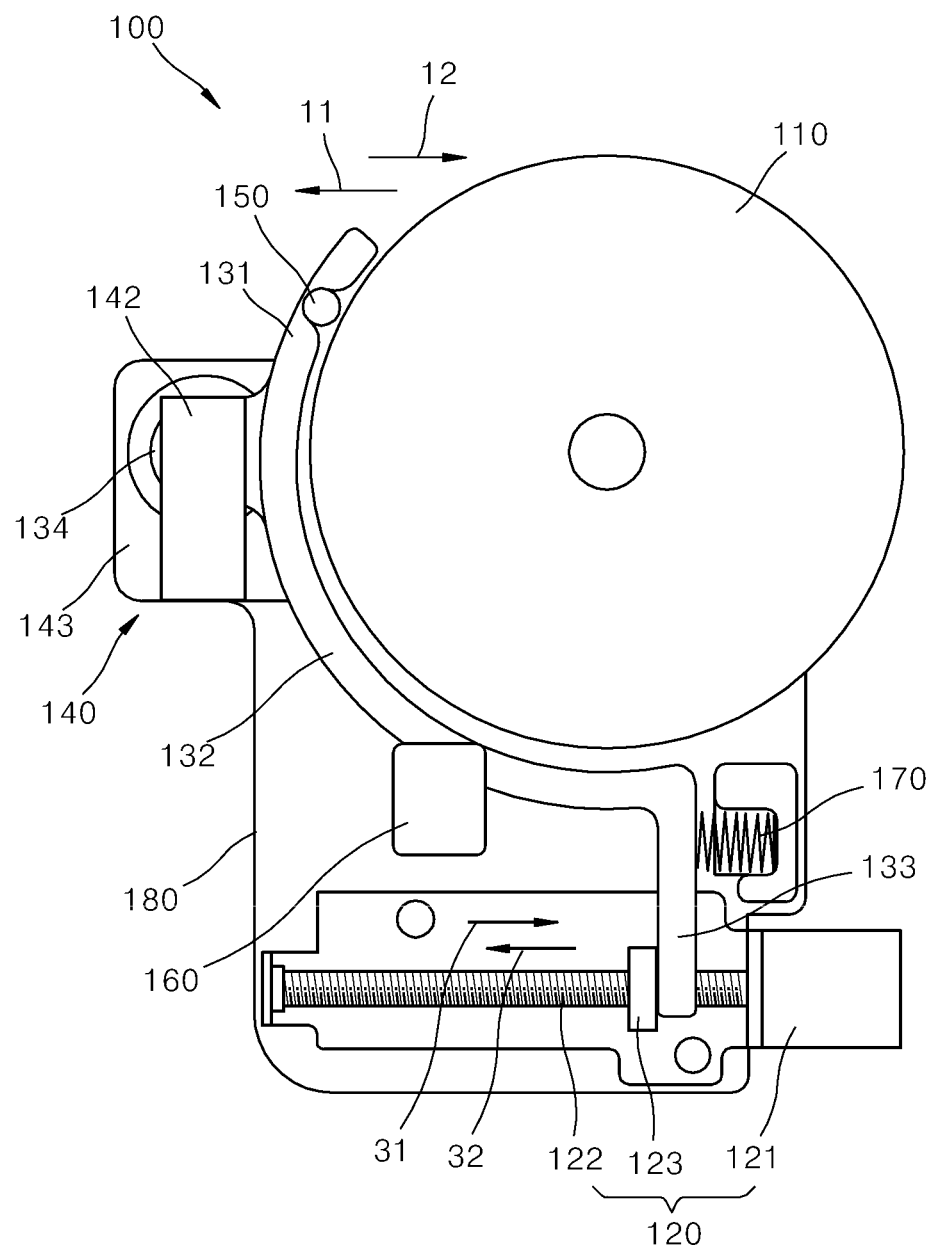
FIG. 4 is a plane view of the brake apparatus of an external-rotor motor according to the first embodiment of the present invention, when viewed from the top.
Figure 5:
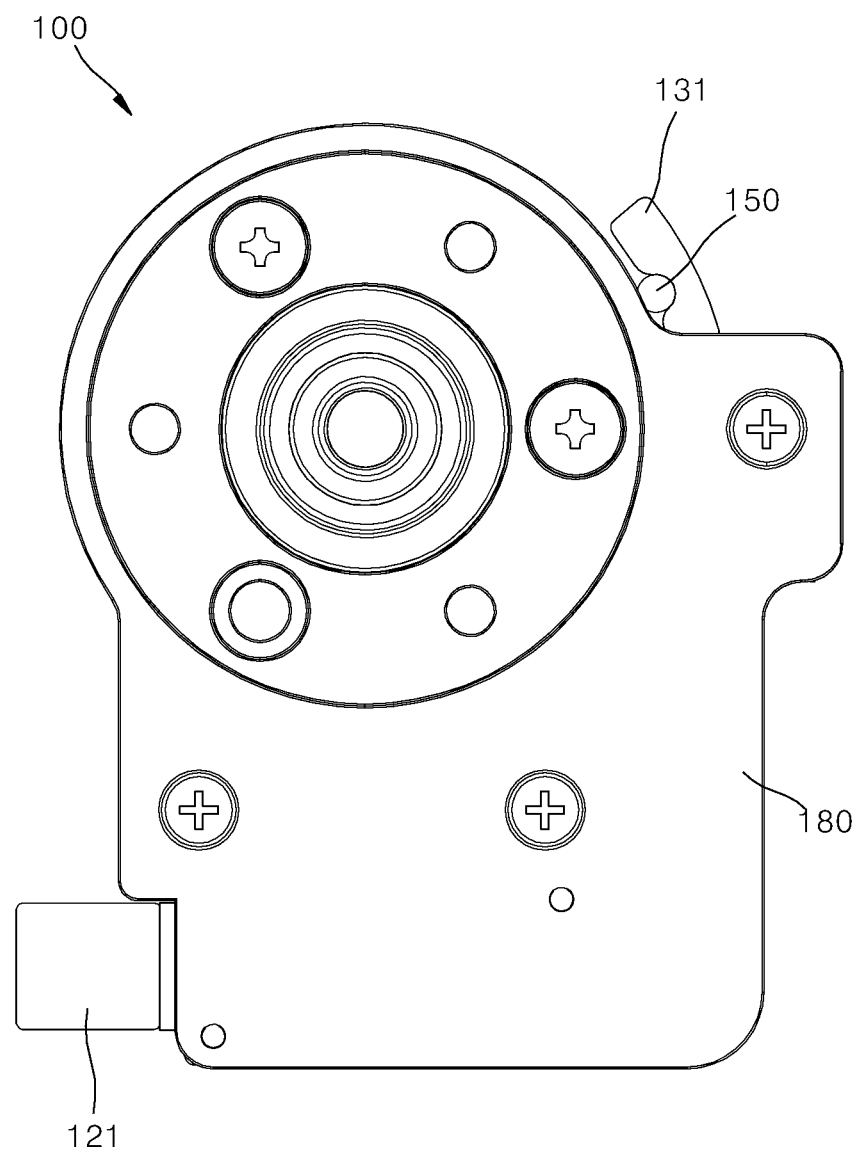
FIG. 5 is a bottom view of the brake apparatus of an external-rotor motor according to the first embodiment of the present invention, when viewed from the bottom.
Figure 6:
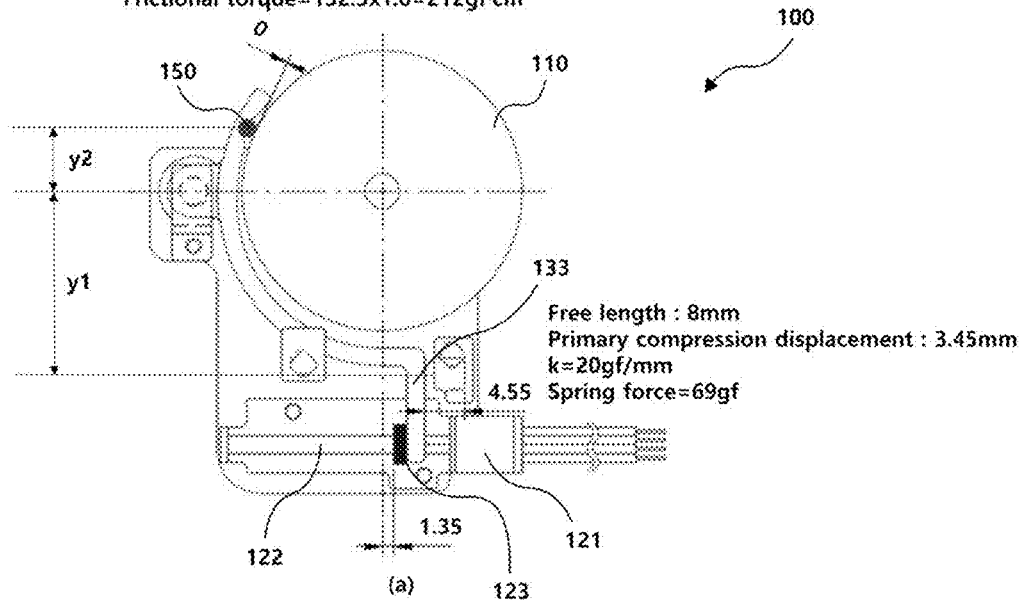
FIG. 6 is a view for quantitatively explaining an operation mechanism of the brake apparatus of an external-rotor motor according to the first embodiment of the present invention.
Figure 6:
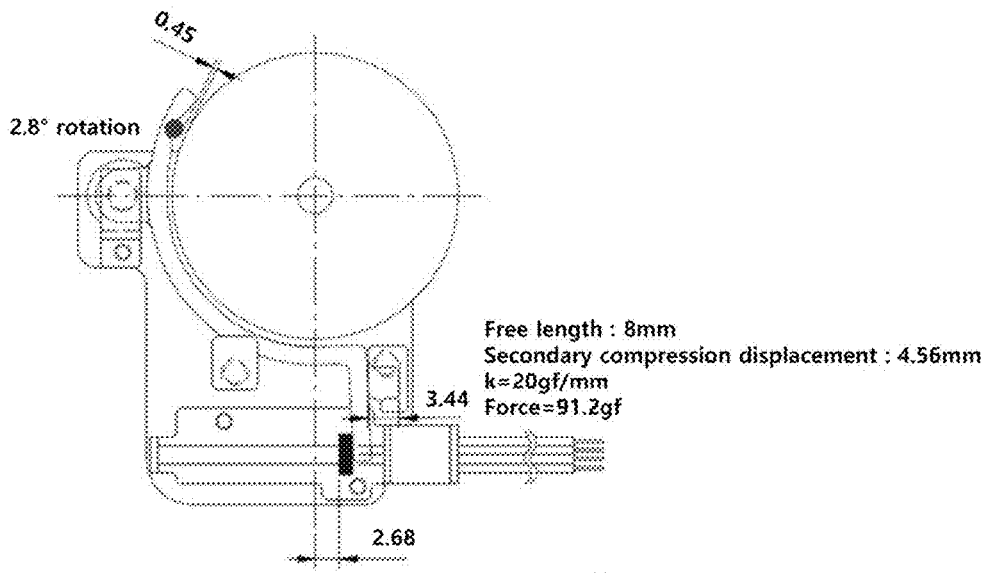

FIG. 2 is a perspective view obtained by obliquely looking down a brake apparatus 100 of an external-rotor motor according to a first embodiment of the present invention. FIG. 3 is a side view the brake apparatus 100 of an external-rotor motor according to the first embodiment of the present invention, when viewed from a lateral side. FIG. 4 is a plan view the brake apparatus 100 of an external-rotor motor according to the first embodiment of the present invention, when viewed from the top. FIG. 5 is a bottom view the brake apparatus 100 of an external-rotor motor according to the first embodiment of the present invention, when viewed from the bottom. FIG. 6 is a view for quantitatively explaining an operation mechanism of the brake apparatus of an external-rotor motor according to the first embodiment of the present invention.

First, the summary of the main structures is as follows.

A frame 130 transmits a braking force to a rotor surface of an external-rotor motor 110, and a pivot shaft 140 functions as a motion shaft of the frame 130 while supporting the frame 130 at a specific location on the frame 130. A friction pad 150 is coupled to one end of the frame 130, and contacts the rotor surface of the external-rotor motor to generate braking during a braking operation.

Alternatively, a geared motor in which an electric motor and a reduction gear apparatus are combined into one may be used instead of the external-rotor motor.

The friction pad 150 may be formed of various materials and various forms, such as a rubber lining, stainless steel, and a brake pad, which may show a braking force due to friction. A spring 170 shows a force that pushes the frame 130 such that the frame 130 shows a braking force.

An electrical driving unit 120 includes an electrical driving device 121, a lead screw 122 coupled to the electrical driving device 121 to be rotated according to the driving of the electrical driving device 121, and a slider 123 configured to restrict movement of the frame 130 in a specific line when being braked, or push the frame 130 in a specific direction when being released. The term 'an electrical driving device 121' described below is used as a term including various driving devices, such as a stepping motor, a general motor, a geared motor, and a solenoid.

As an embodiment, when a power source of an external-rotor motor that is used for a driving source that drives the head or a joint of the robot directly or indirectly (when a gear or another mechanism is connected between a protruding shaft of the external-rotor motor and the head or the joint of the robot) is switched on, the lead screw 122 is rotated according to the driving of the electrical driving device 121, and the slider 123 engaged with the lead screw 122 is moved so that the braking is released as the frame is spaced apart from the rotor surface of the external-rotor motor. In the frame 130, a left frame part 131, a right frame part 132, a spring contact part 133, and a shaft coupling part 134 are integrally formed. During the driving of the electrical driving device 121, the lead screw 122 functions to reinforce a thread thrust with which the slider 123 pushes the frame against the pushing force of the spring 170.

Hereinafter, an operation and a structure of the brake apparatus 100 of the external-rotor motor will be described in detail.

The external-rotor motor is a motor that drives a device, on which the brake apparatus 100 of the external-rotor motor is mounted, for example, a device such as a robot. When it is assumed that a moving part of a robot, for example, the head part described with reference to FIG. 1 is driven, the external-rotor motor 110 is responsible for the driving of the head part. As will be described below, the brake apparatus 100 of the external-rotor motor according to the present invention operates as a brake as the rotor is stopped by a frictional torque generated when the friction pad 150 attached to one side of the frame 130 pushes a rotor surface 111 of the external-rotor motor 110.

The principle of applying or releasing a braking operation by the brake apparatus 100 of the external-rotor motor according to the present invention will be described below.

The frame 130 of the brake apparatus 100 of the external-rotor motor according to the present invention moves as a lever while the fixed pivot shaft 140 is taken as a support point. That is, as illustrated in FIG. 3, because the frame 130 is coupled to the shaft 141 such that the shaft 141 of the pivot shaft 140 passes through the center of the shaft coupling part 134, it moves while taking the shaft 141 as an axis thereof. This uses the principle in which a see-saw moves in opposite vertical directions while taking the support point thereof as an axis. The shaft coupling part 134 and the shaft 141 are integrally formed. A shaft guide 142 supports the shaft 141 on the shaft 141 and a holder 143 includes a hole, through which the shaft 141 passes, to support the shaft 141 that passes through the holder 143. A bearing (not illustrated) is provided between a pipe, through which the shaft 141 passes, and the shaft 141 in the holder 143 so that the shaft may smoothly rotate. A ball bearing or a sintered bearing may be used as a bearing. However, the bearing is not essentially necessary in the present invention, but for example, a metal contact or a plastic contact, which does not require a bearing, may be used.

If a spring contact part 133 is pushed toward the electrical driving apparatus 121 by the slider 123 as the slider 123 moves toward the electrical driving device 121 as the electrical driving device 121 and the lead screw 122 rotate (31, see FIG. 4), the left frame part 131 of the frame 130, which is a left part of the shaft 141 that is a pivot shaft, moves in a direction 11 (see FIG. 4) that becomes far away from the external-rotor motor 110, and accordingly, the friction pad 150 is spaced apart from the rotor surface 111 of the external-rotor motor 110 so that the braking is released.

Further, in contrast, if the right frame part 132 of the frame 130, which is a right part of the shaft 141, and the spring contact part 133 move to a side that is opposite to the electrical driving device 121 due to the pushing force of the spring 170 (32, see FIG. 4), the left frame part 131 of the frame 130, which is a left part of the shaft 141 that is a pivot shaft, moves in a direction 12 (see FIG. 4) that becomes closer to the external-rotor motor 110, and accordingly, the friction pad 150 contacts the rotor surface of the external-rotor motor 110 so that the braking is applied. Then, because a distance from the shaft coupling part 134 to the spring contact part 133 is much larger than a distance from the shaft coupling part 134 to the friction pad 150 of the left frame part 131, a large force may be applied to the friction pad 150 even only with a small force applied to the spring 170 by the principle of a lever so that the braking may be efficiently applied.

Although it is illustrated in the drawings that a rotor surface of the external-rotor motor 110 is a side surface of the rotor, the present invention is not necessarily limited thereto but the rotor surface of the external-rotor motor may be an upper surface, a side surface, or a lower surface of the rotor.

Hereinafter, an operation mechanism when a power source of the external-rotor motor is switched on and off may be described with reference to FIGS. 2 to 5.

As an embodiment, when a power source of an external-rotor motor that is used for a driving source that drives the head or a joint of the robot directly or indirectly (when a gear or another mechanism is connected between a protruding shaft of the external-rotor motor and the head or the joint of the robot) is switched off, the electrical driving device 121 and the lead screw 122 are controlled to rotate in a direction that allows the slider 123 engaged with the thread of the lead screw 122 to proceed to a direction 32 (see FIG. 4) that is opposite to the electrical driving device 121. That is, when the power source is switched off, the electrical driving device 121 and the lead screw 122 are controlled to be stopped after the slider 123 engaged with the thread of the lead screw 122 is moved to an opposite direction of the electrical driving device 121 by a specific distance. Accordingly, the spring contact part 133 is moved to a location point of the slider 123 by the pushing force of the spring 170 and the left frame part 131 is moved to a direction 12 (see FIG. 4) that becomes closer to the external-rotor motor 110, and accordingly, the friction pad 150 contacts the rotor surface of the external-rotor motor 110, applying a braking operation.

The function of the spring 170 is to push the spring contact part 133 when the power source is switched off as described above so that the friction pad 150 of the left frame part 131 contacts the rotor surface of the external-rotor motor 110, applying a braking operation. By selecting the spring 170 having a suitable elasticity when such a spring 170 is selected, the friction pad 150 may be prevented from excessively strongly contacting the rotor surface of the external-rotor motor 110 so that the breaking force may be adjusted not to be excessively strong. This is similar to the case in which so called "Post-it" may be stuck and released several times without damaging the paper by maintaining a weak bonding force while a general bonding tape has a strong bonding force by which paper cannot be released without damaging the paper, and may be achieved by selecting the spring 170 having a suitable elasticity.

Further, during the braking operation, the slider 123 restrains the spring contact part 133 from exceeding a specific limit to prevent the friction pad 150 from being excessively strongly attached to the rotor surface of the external-rotor motor 110. Further, during the braking operation, a frame guide 160 also sets a limit by which movement of the right frame part 132 is limited.

The advantage of 'maintaining a weak braking force' is as follows.

The brake of a product, such as an electric vehicle, requires stability by which a brake should not be released once being applied, whereas, for example, it is preferable that 'the home robot' or 'the social robot', which has been described above, has a weak braking force.

When the power source of the home robot is switched off, the 'head' part that was driven and moved when the power was switched on will weakly return to a specific direction in a form in which the head of the home robot is lowered without a brake apparatus. However, if the brake is automatically driven when the power source is switched off as in the present invention, the head may be properly stopped without being behaving that way. The expression of 'properly stopped' means that the head is naturally stopped as if it was moved slightly without being stopped as if it was abruptly frozen as the power source is switched off. The reason why the present invention may achieve the advantage is that the friction pad 150 is prevented from abruptly contacting the rotor surface 111 due to abrupt movement of the frame 130, by the spring 170 so that the head may be prevented from being stopped as if it was frozen. That is, the friction pad 150 may smoothly contact the rotor surface 111 due to the spring 170 as the frame 130 moves, and accordingly, the head of the home robot is also naturally stopped through slight movement.

Further, even when the head of the home robot is finally stopped by switching off the power source, the head of the home robot may be smoothly moved due to a 'weak braking state' by an operation of the spring 170 of the brake apparatus 100 of the external-rotor motor according to the present invention when an 'external force' for interaction with the robot is applied, for example, the head of the home robot is slightly pushed by the user. If the external force is stopped, the movement of the head of the home robot is naturally stopped again.

Even when the user switches off the power source in this way, the user experiences a more natural interaction with the robot due to the robot that reacts with a touch in a natural behavior, and the brake apparatus of the external-rotor motor according to the present invention realizes such an 'emotional' brake system.

Thereafter, as an embodiment, when a power source of an external-rotor motor that is used for a driving source that drives the head or a joint of the robot directly or indirectly (when a gear or another mechanism is connected between a protruding shaft of the external-rotor motor and the head or the joint of the robot) is switched on, the electrical driving unit 120 is operated so that the braking is released. When the power source is switched on, the rotational direction of the electrical driving device 121 and the lead screw 122 is set to a direction 31 (a movement direction of the frame when the braking is released, the arrow of FIG. 4) that allows the slider 123 engaged with the thread of the lead screw 122 to move toward the electrical driving device 121. The slider 123 moving in this way pushes the spring contact part 133 toward a direction 31 of the electrical driving device 121. Accordingly, the left frame part 131 moves in a direction that becomes far away from the rotor 110 while taking the shaft 141 of an axis of a lever so that the braking is released.

FIG. 6 is a view for quantitatively explaining an operation mechanism of the brake apparatus of an external-rotor motor according to the first embodiment of the present invention.

The values described bellows are simply values as an embodiment, and, of course, may be changed according to necessities.

FIG. 6A illustrates a case in which, as an embodiment, when a power source of an external-rotor motor that is used for a driving source that drives the head or a joint of the robot directly or indirectly (when a gear or another mechanism is connected between a protruding shaft of the external-rotor motor and the head or the joint of the robot) is switched off, the braking is applied. As the power source is switched off, the rotational direction of the electrical driving device 121 and the lead screw 122 is controlled such that the slider 123 is moved to the left direction, that is, to a direction that becomes far away from the electrical driving device 121. In FIG. 6A, the slider 123 was moved to be spaced apart from the center line of the external-rotor motor 110 by 1.35 mm. Accordingly, the spring 170 (see FIGS. 2 to 5 and not illustrated in FIG. 6) pushes the spring contact part 133 to the left until the spring contact part 133 reaches the slider 123 so that the friction pad 150 contacts the rotor surface of the external-rotor motor 110. Further, during the braking operation, the slider 123 restrains the spring contact part 133 from exceeding a specific limit to prevent the friction pad 150 from being excessively strongly attached to the surface of the rotor of the external-rotor motor 110. Further, during the braking operation, a frame guide 160 also sets a limit line by which movement of the right frame part 132 is limited.

In FIG. 6A, when it is assumed that a length of the spring when an external force is not applied is L, a deformation of the spring in a state in which a brake is applied is $\Delta L$, and an elasticity of the spring is k, a restoring force of the spring 170 is:

$$F = k \cdot \Delta L. \quad \text{[Equation 1]}$$

When it is assumed that a vertical distance from the shaft 141 to the friction pad 150 is y2, a vertical distance from the shaft 141 to the spring is y1, and a vertical load applied to the friction pad 150 in a central direction of the rotor 110 is N, in order to achieve equilibrium of torque, $$y2 \cdot N = y1 \cdot F \quad \text{[Equation 2]}$$

is established, and from Equation 2, $$N = \frac{y1}{y2} \cdot F \quad \text{[Equation 3]}$$

is established.

When it is assumed that a maximum static frictional coefficient between a surface of the external-rotor motor 110 and the friction pad 150 is $\mu$, a maximum static frictional force applied to the surface of the external-rotor motor 110 by the friction pad 150 in a state in which a brake is applied is:

$$f = \mu \cdot N \quad \text{[Equation 4]}$$

, and accordingly, a frictional torque T applied to the surface of the external-rotor motor 110 in a state in which a brake is applied when a radius of the external-rotor motor 110 is r is:

$$T = f \cdot r \quad \text{[Equation 5]}$$

Accordingly, if Equations 4 and 3 are applied to Equation 5, $$T = \mu \cdot \left(\frac{y1}{y2} \cdot F\right) \cdot r \quad \text{[Equation 6]}$$

is established, and from Equation 6, $$F = \frac{T}{\mu \cdot \left(\frac{y1}{y2}\right) \cdot r} \quad \text{[Equation 7]}$$

is established. if Equation 1 is applied to Equation 7, $$k \cdot \Delta L = \frac{T}{\mu \cdot \left(\frac{y1}{y2}\right) \cdot r} \quad \text{[Equation 8]}$$

is established. That is, if the frictional torque T, the maximum static frictional coefficient $\mu$, the lever ratio y1/y2, and the radius r of the external-rotor motor 110 are set, necessary $\Delta L$ may be calculated by setting the elasticity k of the spring 170 in advance or the elasticity k of the spring may be calculated by setting $\Delta L$ in advance.

In FIG. 6A, L is 8 mm, ΔL is 3.45 mm, k is 20 gf/mm, the lever ratio y1/y2 is 3.2, r is 1.6 cm, and μ is 0.6.

Here, the restoring force of the spring is F=kΔL=20×3.45=69 gf by using Equation 1, the vertical load is N=(y1/y2) F=3.2×69=220.8 gf by using Equation 3, and the frictional force is f=μN=0.6×220.8=132.5 gf by using Equation 4. The frictional torque becomes T=fr=132.5×1.6=212 gf cm by using Equation 5.

FIG. 6B illustrates a case in which, as an embodiment, when a power source of an external-rotor motor that is used for a driving source that drives the head or a joint of the robot directly or indirectly (when a gear or another mechanism is connected between a protruding shaft of the external-rotor motor and the head or the joint of the robot) is switched on, the braking is released. As the power source is switched on, the rotational direction of the electrical driving device 121 and the lead screw 122 is controlled such that the slider 123 is moved to the right direction, that is, to a direction that becomes closer to the electrical driving device 121.

In FIG. 6B, L is 8 mm, ΔL is 4.56 mm, k is 20 gf/mm, and the restoring force of the spring is F=kΔL=20×4.56=91.2 gf by using Equation 1.

In FIG. 6B, the slider 123 was moved to be spaced apart from the center line of the external-rotor motor 110 by 2.68 mm. This distance is obtained by further moving the slider 123 to the right side by 1.33 mm than in the braking state of FIG. 6A. From this, the slider 123 pushes the spring contact part 133 to the right side, and the friction pad 150 maintains a distance (brake releasing displacement) that is spaced apart from the contact point of the rotor surface of the external-rotor motor 110 by 0.45 mm.

In this way, a thrust of the electrical driving device, that is, a minimum value of a thread thrust for allowing the slider 123 that moves to the right side through rotation of the electrical driving device 121 and the lead screw 122 to push the spring contact part 133 against the spring 170 may be obtained in the following equation.

Minimum necessary thread thrust=Load of spring+ Weight of frame     [Equation 9]

Accordingly, the minimum necessary thread thrust in FIG. 6B is 91.2 (a load of the spring)+15 (a weight of the frame)=106.2 gf. The thrust of the electrical driving device is amplified due to the rotation of the lead screw, and in this way, the thread thrust for releasing braking through the rotation of the electrical driving device and the lead screw has to be maintained at a value of 106.2 gf or more.

Figure 7:
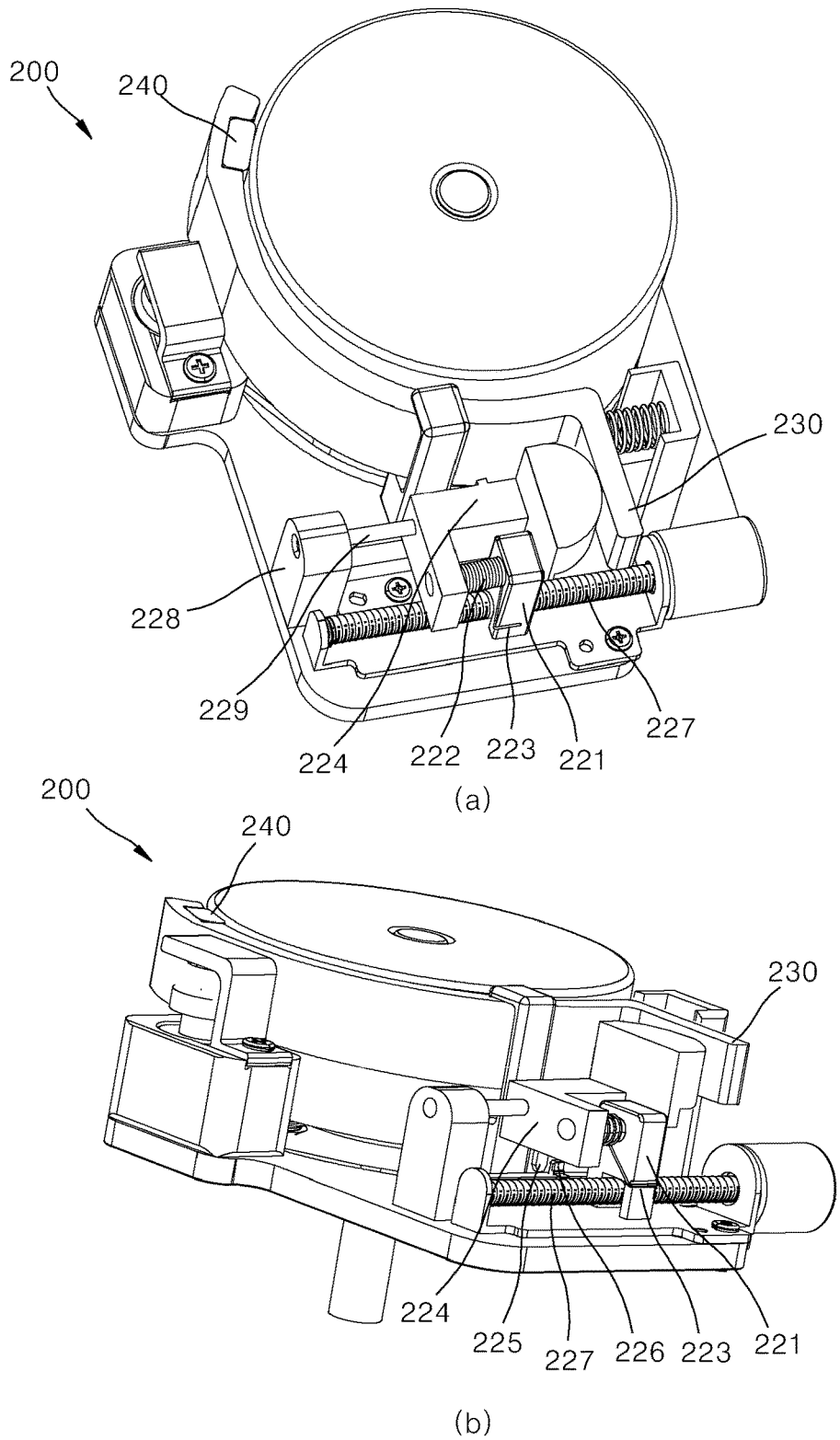
FIG. 7 is a view illustrating a brake apparatus of an external-rotor motor according to a second embodiment of the present invention.
Figure 8:
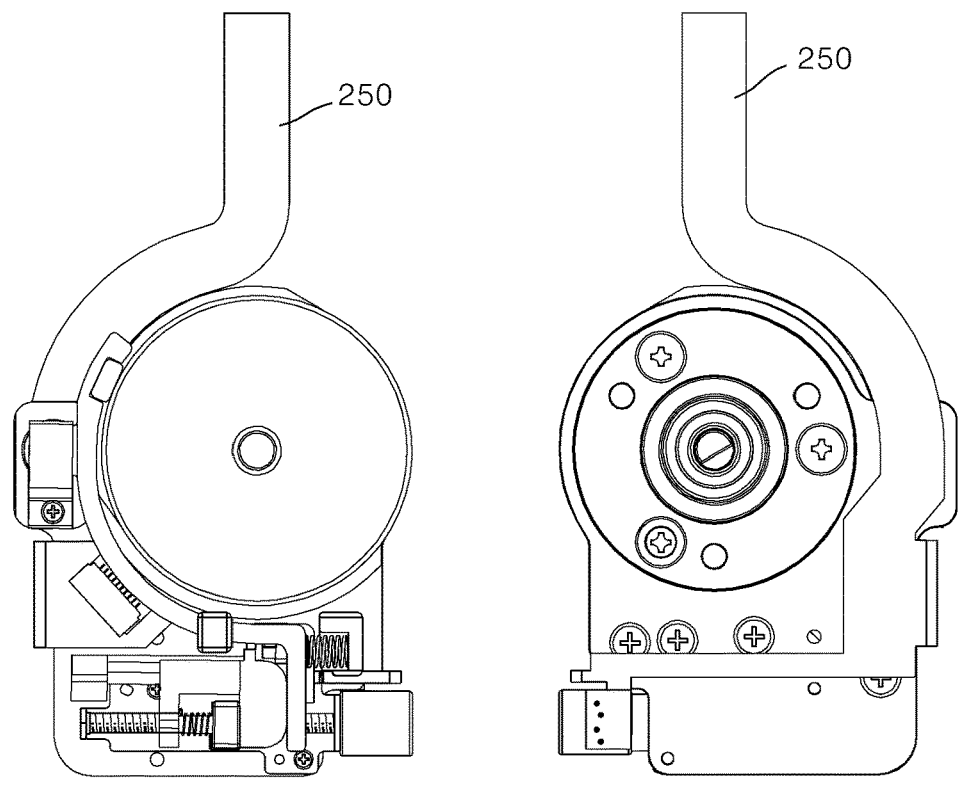
FIG. 8 is a view illustrating a state in which an FPCB is provided in a brake apparatus of an external-rotor motor according to the present invention.
Figure 8:
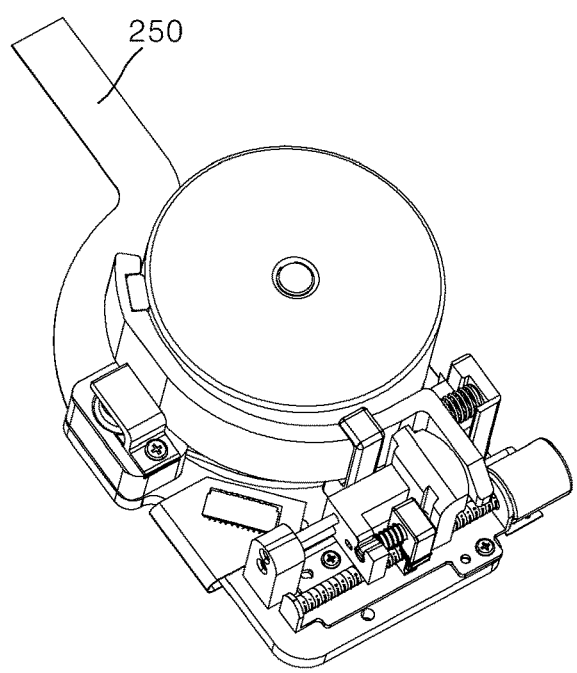

FIG. 7 is a view illustrating a brake apparatus 200 of an external-rotor motor according to a second embodiment of the present invention. FIG. 8 is a view illustrating a state in which an FPCB 250 is provided in a brake apparatus of an external-rotor motor according to the present invention.

The brake apparatus 200 of the external-rotor motor of FIG. 7 is configured such that the lead screw slider 221 has an inverse U shape unlike the slider 123 of the brake apparatus 100 of the external-rotor motor according to the first embodiment. As the lead screw slider 221 is further pressed to the lead screw 227 by the torsion spring 222, it may be moved while being stably engaged with the thread of the lead screw. FIG. 7 illustrates a state in which the lead screw slider 221 is pressed by an end 223 of the torsion spring.

Further, the brake apparatus 200 of the external-rotor motor of FIG. 7 includes a rail shaft 229 disposed beside the lead screw 227 in parallel to the lead screw 227, and the rail shaft 229 is supported by a slider guide 228. A slider 224 (hereinafter, referred to as a 'second slider') that moves as the lead screw slider 221 moves is provided on the rail shaft 229, and when the braking is released as the power source is switched on, the second slider 224 on the rail shaft 229 is moved as the lead screw slider 221 is moved, and accordingly, the second slider 224 on the rail shaft 229 pushes the frame 230. Then, a location of the slider 224 is recognized by a 'U-shaped' slider sensor 226 that detects movement of a bar 225 provided below the second slider 224 to determine at which point the slider 224 is to be stopped to control movement.

Further, the friction pad 240 of FIG. 7 has a rubber lining structure.

FIG. 8A is a plane view of a state in which an FPCB 250 is provided in a brake apparatus of an external-rotor motor according to the present invention, FIG. 8B is a bottom view of a state in which the FPCB 250 is provided in the brake apparatus of the external-rotor motor according to the present invention, and FIG. 8C is a perspective view of a state in which the FPCB 250 is provided in the brake apparatus of the external-rotor motor according to the present invention. The FPCB 250 of FIG. 8 may be installed in both the brake apparatus 100 of the external-rotor motor according to the first embodiment of the present invention and the brake apparatus 200 of the external-rotor motor according to the second embodiment.

In FIG. 8, the flexible PCB (FPCB) 250 functions to transmit a control signal between the brake apparatus 100 or 200 of the external-rotor motor according to the present invention, and a control device (not illustrated) that controls the brake apparatus 100 or 200 of the external-rotor motor. Here, the control signal includes a signal for controlling the brake apparatus 100 or 200 of the external-rotor motor by the control device, and various operation signals detected by the brake apparatus 100 or 200 of the external-rotor motor and transmitted to the control device.

What is claimed is:

1. A brake apparatus of an external-rotor motor, comprising:
   a frame configured to transmit a braking force to a rotor surface of the external-rotor motor;
   a pivot shaft functioning as a motion axis of the frame while supporting the frame at a specific location on the frame;
   a friction pad coupled to one end of the frame and contacting the rotor surface of the external-rotor motor as the frame moves;
   a spring configured to apply a pushing force to a spring contact part at an opposite end of the frame; an electrical driving device;
   a lead screw coupled to the electrical driving device and rotated according to driving of the electrical driving device; and
   a slider engaged with the lead screw, translated on the lead screw as the lead screw rotates according to the driving of the electrical driving device, and configured to apply a force that is resistant to a pushing force of the spring to the spring contact part of the frame.

2. The brake apparatus of claim 1, wherein when a power source is switched off, the lead screw is rotated such that the slider is moved in a direction that becomes far away from the electrical driving device, and the frame is moved by a force of the spring, by which the spring contact part is pushed, such that the friction pad at one end thereof contacts the rotor surface of the external-rotor motor, and
   wherein when a power source is switched on, the lead screw is rotated such that the slider is moved in a direction that becomes closer to the electrical driving device, and the frame is moved by a force, with which the spring contact part is pushed by the slider, such that the friction pad at one end thereof is separated from the rotor surface of the external-rotor motor.

3. The brake apparatus of claim 2, wherein when the power source is switched off, a final location of the slider becomes a limit point, by which movement of the spring contact part due to the pushing force of the spring is limited.

4. The brake apparatus of claim 1, further comprising:
a flexible PCB functioning to deliver a control signal between the brake apparatus of the external-rotor motor and a control device configured to control the brake apparatus of the external-rotor motor.

5. A brake apparatus of an external-rotor motor, comprising:
a frame configured to transmit a braking force to a rotor surface of the external-rotor motor;
a pivot shaft functioning as a motion axis of the frame while supporting the frame at a specific location on the frame;
a friction pad coupled to one end of the frame and contacting the rotor surface of the external-rotor motor as the frame moves;
a spring configured to apply a pushing force to a spring contact part at an opposite end of the frame; an electrical driving device;
a lead screw coupled to the electrical driving device and rotated according to driving of the electrical driving device;
a slider engaged with the lead screw and translated on the lead screw as the lead screw rotates according to driving of the electrical driving device;
a rail shaft disposed beside the lead screw in parallel to the lead screw; and a second slider located on the rail shaft and translated as the slider on the lead screw is translated.

6. The brake apparatus of claim 5, further comprising:
a slider sensor located below the second slider and configured to detect movement of the second slider to recognize a location of the second slider.

7. The brake apparatus of claim 6, wherein a vertical bar is attached to the second slider, and
wherein the slider sensor detects movement of the bar to recognize the location of the second slider.

8. The brake apparatus of claim 5, further comprising:
a torsion spring functioning to press the slider on the lead screw to the lead screw such that the slider on the lead screw is moved while being stably engaged with thread of the lead screw.

9. The brake apparatus of claim 5, wherein when a power source is switched off, the lead screw is rotated such that the slider is moved in a direction that becomes far away from the electrical driving device, and the frame is moved by a force of the spring, by which the spring contact part is pushed, such that the friction pad at one end thereof contacts the rotor surface of the external-rotor motor, and
wherein when a power source is switched on, the lead screw is rotated such that the slider is moved in a direction that becomes closer to the electrical driving device, and the frame is moved by a force, with which the spring contact part is pushed by the second slider translated together with the slider, such that the friction pad at one end thereof is separated from the rotor surface of the external-rotor motor.

10. The brake apparatus of claim 5, further comprising:
a flexible PCB functioning to deliver a control signal between the brake apparatus of the external-rotor motor and a control device configured to control the brake apparatus of the external-rotor motor.

* * * * *